March 23, 1926.
J. D. TEW
1,577,664
APPARATUS FOR MAKING TIRE CASINGS
Filed May 15, 1923    2 Sheets-Sheet 1
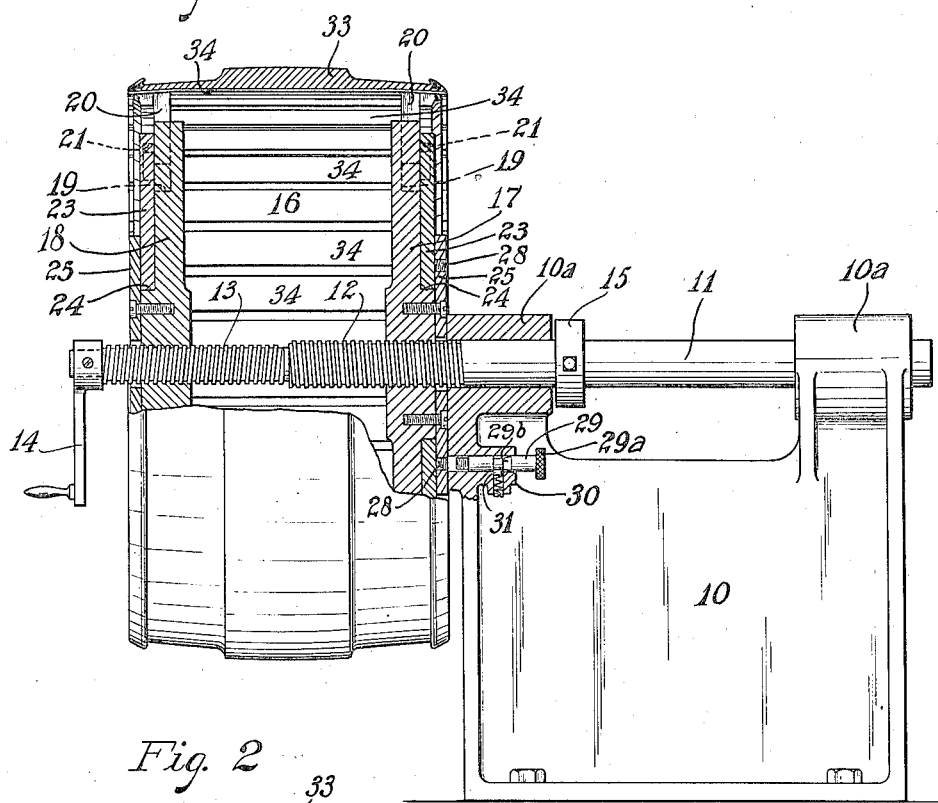
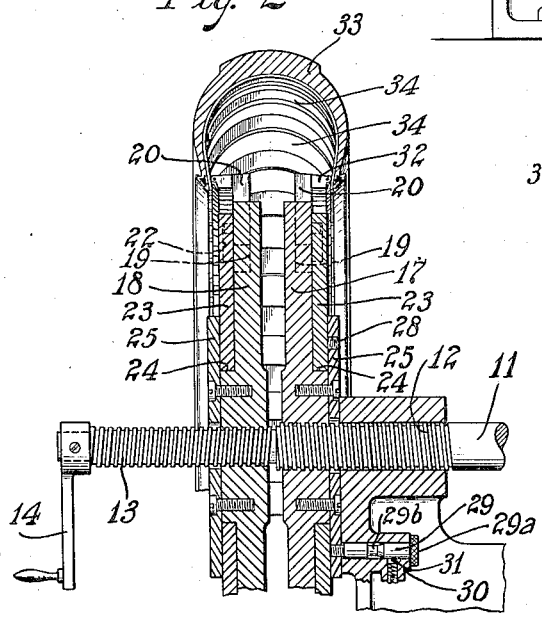
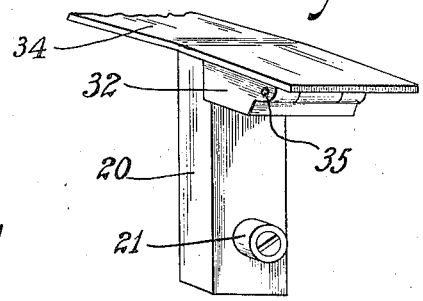
Inventor
James D. Tew.
By Robert M. Pierson
Atty.

March 23, 1926.
J. D. TEW
1,577,664
APPARATUS FOR MAKING TIRE CASINGS
Filed May 15, 1923 2 Sheets-Sheet 2
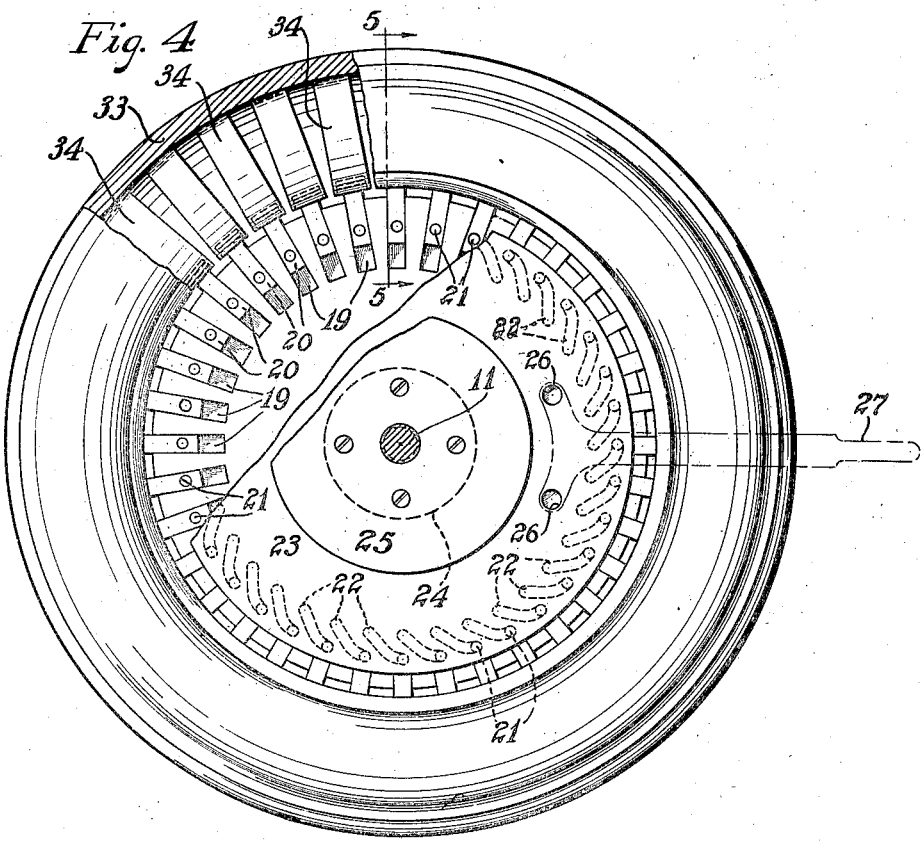
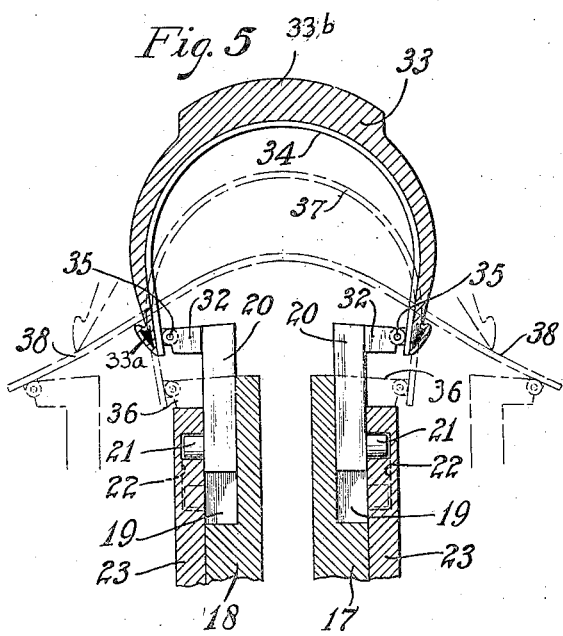
Inventor
James D. Tew.
By Robert M. Pierson
Atty.

Patented Mar. 23, 1926.

1,577,664

UNITED STATES PATENT OFFICE.

JAMES D. TEW, OF HUDSON, OHIO, ASSIGNOR TO THE B. F. GOODRICH COMPANY, OF NEW YORK, N. Y., A CORPORATION OF NEW YORK.

APPARATUS FOR MAKING TIRE CASINGS.

Application filed May 15, 1923. Serial No. 639,066.

*To all whom it may concern:*

Be it known that I, JAMES D. TEW, a citizen of the United States, residing at Hudson, in the county of Summit and State of Ohio, have invented a certain new and useful Apparatus for Making Tire Casings, of which the following is a specification.

This invention relates to apparatus for making pneumatic vehicle tires, and more particularly tires which are first formed as a laterally flat or substantially flat annular band and then formed to tire shape by expanding the middle or tread portion of the band. My invention is especially advantageous in the construction of tires from weak-wefted or weftless cord fabric, since in its use the tire plies may be stretched to tire shape with substantially uniform tension throughout, so that the tire subsequently may be vulcanized on an inexpansible core with substantially as good results as have heretofore been obtained by the use of an expansible core in the vulcanizing operation, and with less expense.

Prior to my invention tires have been formed by stretching the middle portion of a flat, completely built tire band, as by the application of differential fluid pressures to the opposite faces of the band, or by forcing such portion outward by means of radially acting core sections, but the fluid pressure method requires expensive apparatus and involves difficulties of manipulation, as in the matter of accurately mounting the tire in or on the expanding apparatus, and the use of radially acting core sections such as heretofore have been employed is not adapted to produce such uniform stretching of the band as I obtain. Moreover, in all prior practice, so far as I am aware, the band has been formed on one support and then removed therefrom and associated with other apparatus for the expanding operation.

My general object is to provide simple and improved apparatus and procedure for forming a tire from a laterally flat band of tire building material. More specific objects are to stretch the band uniformly, to reduce the number of steps involved by shaping the band upon the support whereon it is built, without transferring it from one apparatus to another, and to produce a finished tire of good quality without the use of an expansible core in the vulcanizing operation.

Of the accompanying drawings:

Fig. 1 is a side elevation, partly in section, of a preferred form of apparatus embodying and adapted to carry out my invention, and a tire band built thereon.

Fig. 2 is a vertical, sectional view, from the same view point as Fig. 1, of part of the apparatus and the tire band after the latter has been expanded to tire form.

Fig. 3 is a perspective view, on a larger scale, of a radially acting slide and a band-manipulating spring plate hinged thereto.

Fig. 4 is an end elevation of my tire building drum, and a finished tire thereon, with parts broken away.

Fig. 5 is a section on line 5—5 of Fig. 4, showing the method of removing the finished tire from the apparatus.

Referring to the drawings, 10 is a base or support, provided with a pair of aligned bearings $10^a$, $10^a$ in which is rotatably mounted a screw shaft 11, one end of which overhangs from said base, is formed with right-hand and left-hand threads 12 and 13, and is provided with a hand crank 14. 15 is a stop collar adjustably secured upon the shaft 11 to retain the shaft in its bearings but to permit it to slide axially therein.

Mounted upon the overhanging threaded end of the shaft 11 is a hollow drum 16, comprising vertically-disposed, centrally-apertured and threaded disk-like end members 17 and 18, screwing onto the threads 12 and 13 respectively, the latter thread, 13, on the outer portion of the shaft, being of less diameter than the thread 12, so that in assembling the parts of the apparatus the inner or rear end-members 17 may pass freely over the thread 13 to screw upon the thread 12. The outer, vertical face of each end or disk member of the pair is formed with a circular series of radial grooves 19, 19 extending radially inward from its outer periphery. Mounted in each of the grooves 19 is a slide 20, the main body portion of which is flush with the outer face of its supporting disk, said slide having, near its inner end, an outwardly projecting cam roller 21. The several rollers of the set on each disk occupy individual cam grooves 22, 22 in the inner face of a cam plate 23, rotatably mounted on a central boss or hub 24 formed on the outer face of the respective disk, 17 or 18, and held thereon by a retaining plate 25 secured to the hub of the disk. The cam plates 23 are thus adapted to retain the slides 20 in their radial grooves and to slide them from and toward the axis of the drum when the cam plates are turned. For turning the cam plates, each is formed with a pair of adjacent apertures 26, 26 adapted to receive the lugs of a spanner wrench or handle 27, whereby the series of radial slides 20 may be expanded and contracted. While the major portion of each cam slot 22 is oblique to the adjacent periphery of the cam plate, for expanding and contracting the series of slides, the outer end portion of each slot is concentric with the cam plate, as shown in Fig. 4, for locking the slides in their outermost positions.

The retaining plate 25 secured to the rear disk 17 abuts the adjacent shaft-bearing 10$^a$ and is provided with an annular series of threaded apertures 28, 28 adapted alternatively to receive the threaded inner end of a cylindrical locking-bolt 29, having a knurled head 29$^a$, said bolt being rotatably mounted in an apertured boss 30 on the base 10. The stem of said bolt is formed with a circumferential groove 29$^b$, defined by a stop-shoulder at its front end and a taper at its rear end, said groove, when the bolt is in its retracted position, being occupied by a spring-projected plunger 31 which retains the bolt in its mounting and frictionally holds it retracted but permits it to be pressed inward and rotated when it is desired to thread it into one of the apertures 28 to prevent rotation of the drum 16 and axial movement of the end member 17.

Each of the slides 20 is formed at its outer end with a laterally projecting portion 32 of greater width than the groove 19 in which the slide is mounted, said wide portion being off-set so as to clear the respective end member 17 or 18 and move radially inward along the outer face of the latter when the slides are drawn toward the axis of the drum. The off-set portions are preferably of such width circumferentially of the drum as to be approximately in contact with each other when the slides are at their innermost positions.

The immediate support for the tire-band, 33, is made up of a circular series of spring plates 34, 34, arranged about the outer peripheries of the end members 17, 18, spanning the space between the latter, each plate being hinged, as at 35, 35, to the lateral projections 32 of the slides 20, so as to be bowed outward at their middle portions to stretch the middle portion of the tire band when the end members are moved toward each other, and to return to a flattened condition, against the outer end faces of the slides, when said end members are again separated, as shown in Fig. 1. The outer end faces of the slides are preferably so sloped, as shown best in Fig. 5, as to hold the spring plates in a slightly bowed or arched condition even when the end members are farthest apart, so as to assure that the middle portions of the plates will bow outward and not inward when the end members are moved toward each other.

The plates 34 limit the separation of the end members 17, 18 and form, when said members are separated and the slides moved to their innermost positions, a substantially continuous annular surface, substantially flat laterally, to receive the tire as the latter is built.

In the operation of my apparatus, the tire band 33 is built upon the drum while the parts of the apparatus are as shown in Fig. 1, the drum being extended, with the plates 34 substantially flat, the bolt 29 being in its retracted position, and the cam plate 23 being in the position shown in Fig. 4, so that the slides 20 are locked in their outermost positions, and the drum being rotated by means of the crank 14, if desired, to facilitate the building of the band, the substantially flat plates 34 preventing the end members 17, 18, from screwing on their shaft so long as the member 17 is not strongly held against rotation, as by the bolt 29, or so long as the crank is turned only in a direction whereby said end members are urged away from each other. The stop-collar 15 may be secured in such position on the shaft as to cooperate with the retaining plate 25 at the opposite end of the bearing, to prevent axial movement of the shaft in this operation. The tire-band 33 preferably is constructed of weftless or weak-wefted fabric, and the apparatus is particularly applicable to the building of tires having soft or clincher beads, as it does not excessively strain the latter. All parts of a tire may be incorporated in the tire band, including the bead cores 33$^a$, 33$^a$ and tread 33$^b$ as shown, or the fabric carcass only may first be built and shaped and the tread and side walls applied later. When the tire band has been built upon the drum, the bolt 29 is screwed into one of the apertures 28 of the end member 17 to hold the drum stationary, and the hand crank 14 is then turned to rotate the shaft 11 with relation to the end members 17 and 18, in such direction as to drive the end member 18 toward the member 17, the plates 34 preventing rotary movement of said end members with relation to each other. As the member 17 is stationary, the threaded shaft screws therethrough, thus contributing to the movement of the member 17, the shaft 11 sliding axially in its bearings while rotating.

As the end members 17, 18 move toward each other the plates 34, at first but slightly bowed, are further bowed outward at their middle portions, stretching the tire band substantially to tire shape, as shown in Figs. 2, 4 and 5, while the bead portions move axially toward each other without substantial stretch.

If the carcass only has been built before the stretching operation, the remainder of the tire may be added thereto while said carcass is supported upon the flexed plates of the drum.

To remove the tire from the drum 16, the cam plates 23 are so rotated as to draw the slides 20 radially inward to the position shown in broken lines at 36, 36, in Fig. 5, thereby withdrawing the supporting spring plates 34 from full engagement with the tire casing 33, as shown at 37 in the same view, the tire preferably being held, by hand or otherwise, in concentric relation to the drum. The shaft 11 is then rotated in such direction as to cause the end member 18 to move away from the end member 17, thus flattening the spring plates 34 and withdrawing them from within the tire, as indicated at 38 in Fig. 5, and continued separation of the end members returns the spring plates to their substantially flat positions, against the end faces of the slides 20 as in Fig. 1. The flexibility of the tire material makes the withdrawal of the plates a relatively simple and easy operation. The tire is then removed, the bolt 29 is unscrewed from the end member 17 and retracted, the cam plates turned to again expand the drum, and the apparatus is then ready for a repetition of the building operation.

After removal from the building drum the tire may be mounted upon a segmental, inexpansible core and vulcanized and a product of good quality thus obtained, the threads of the tire being so uniformly stretched in the operation above described, that the expansible core commonly employed for cord tires may be dispensed with.

My invention provides simple and inexpensive apparatus and an improved method for building cord tire casings, whereby the fabric plies may be stretched to tire shape without removal from the support on which they are built. The large number of flexible plates, engaging the work throughout small areas respectively and at closely spaced positions are an important feature in providing the proper amount of stretch throughout the circumference of the tire without the use of fluid pressure. Elimination of expansible cores or bags results in substantial economy, since such bags are expensive and short lived, and usually require fluid connections. The apparatus requires but few operations, and all of the operations may be performed by hand power.

My invention is subject to modification within its scope, and I do not wholly limit my claims to the specific apparatus shown nor to the exact procedure described.

I claim:

1. Tire-building apparatus comprising a circumferential set of transversely disposed, deformable, tire-stretching structures adapted to form substantially a cylindrical structure to receive a transversely flat, endless band of tire-building material, means for deforming said structures to stretch the middle portion of said band, and additional means for moving said structures radially, each as a whole, while they are so deformed, to change the effective diameter of their composite structure.

2. Tire-building apparatus comprising a slide-supporting structure, an expandible and contractable circular set of slides mounted thereon, a second slide-supporting structure and a substantially similar set of slides mounted thereon, said second set of slides being coaxial with relation to the first set, deformable tire-stretching structures each hinged to and connecting a slide of one set with a slide of the other set, means for moving said slide-supporting structures toward and from each other, and means for expanding and contracting said sets of slides.

3. Tire-building apparatus comprising a circumferential set of transversely disposed, deformable, tire-stretching structures adapted to constitute substantially a cylindrical support for an endless band of tire-building material, and to be forced outwardly at their middle portions to stretch the middle portion of said band circumferentially, supports for the ends of said structures, the latter being hinged to said supports, and a rotatable cam-plate concentrically mounted with relation to said set of structures for expanding and contracting the latter.

4. Tire-building apparatus comprising a circumferential series of members adapted to engage the inner face of an endless band of tire building material at a multiplicity of positions, the series being adapted to be expanded to stretch said band, and a cam structure adapted to actuate said members simultaneously to move them from or toward the center of the series.

In witness whereof I have hereunto set my hand this 8th day of May, 1923.

JAMES D. TEW.